May 13, 1941.  A. MARTIN  2,242,013
PHOTOGRAPHIC OR CINEMATOGRAPHIC CAMERA OR THE LIKE
Filed Oct. 11, 1938  3 Sheets-Sheet 1
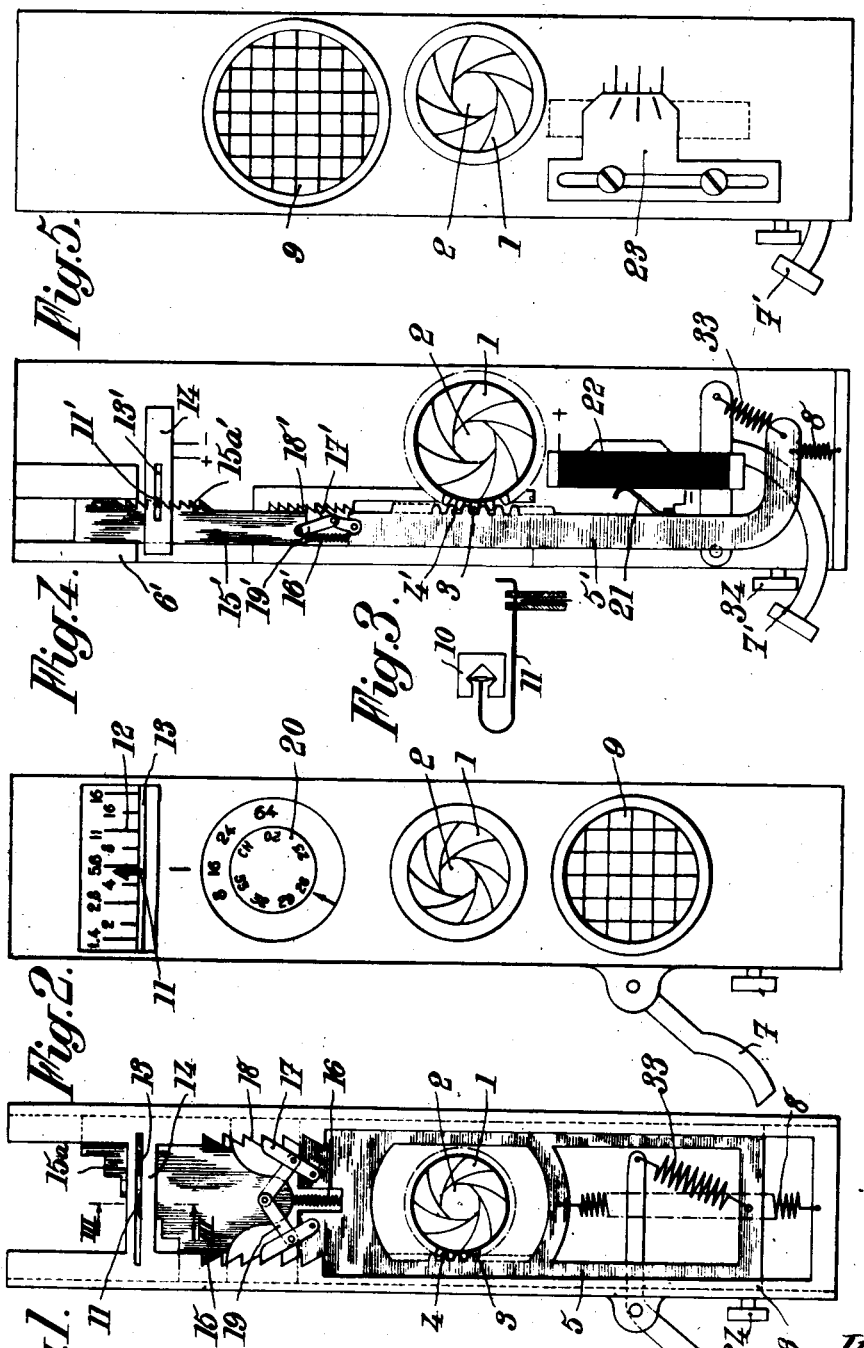
Inventor:
Alphonse Martin,
Attorneys

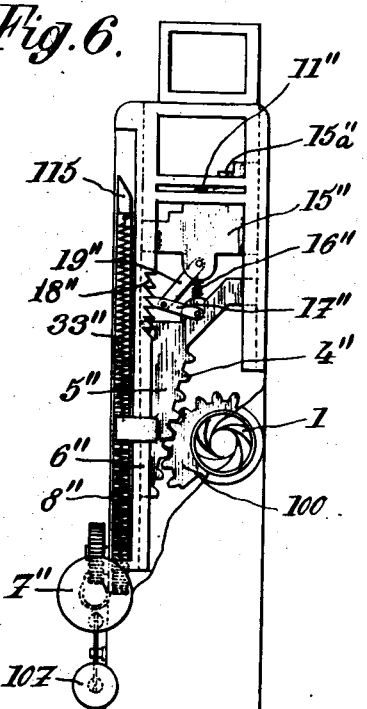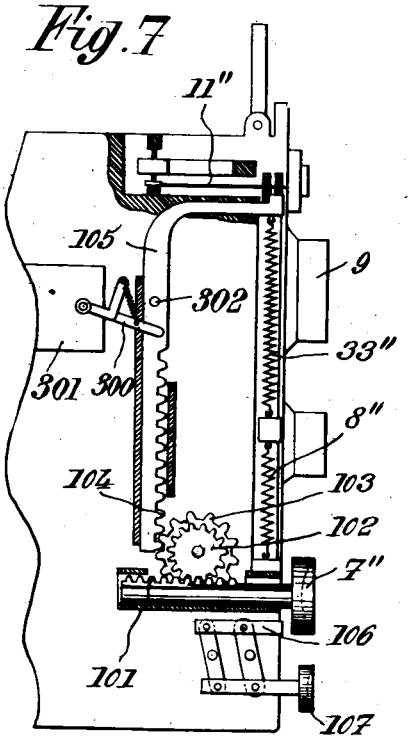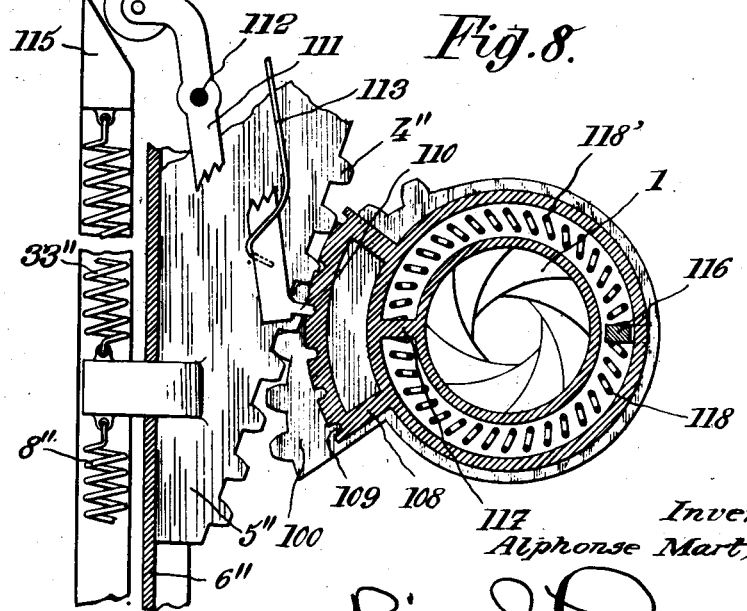

May 13, 1941. A. MARTIN 2,242,013
PHOTOGRAPHIC OR CINEMATOGRAPHIC CAMERA OR THE LIKE
Filed Oct. 11, 1938 3 Sheets-Sheet 3
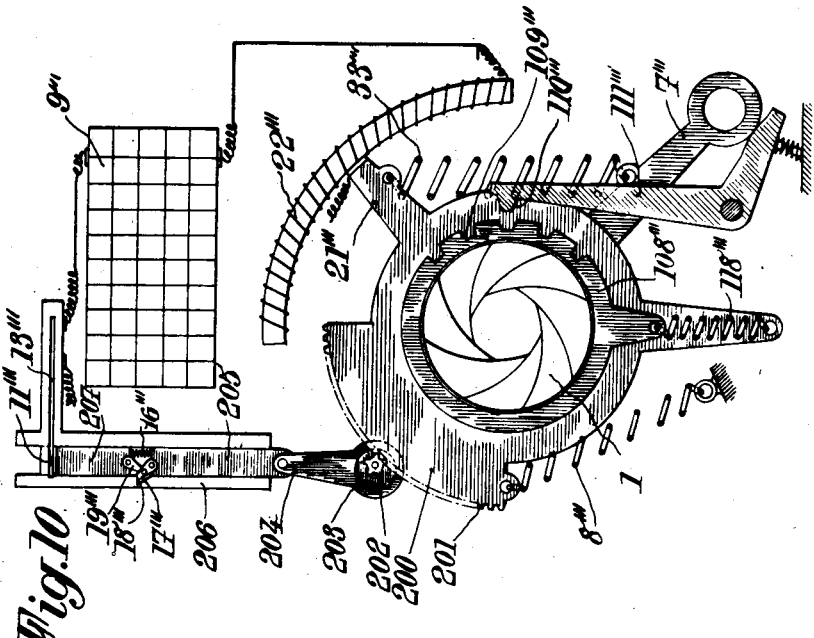
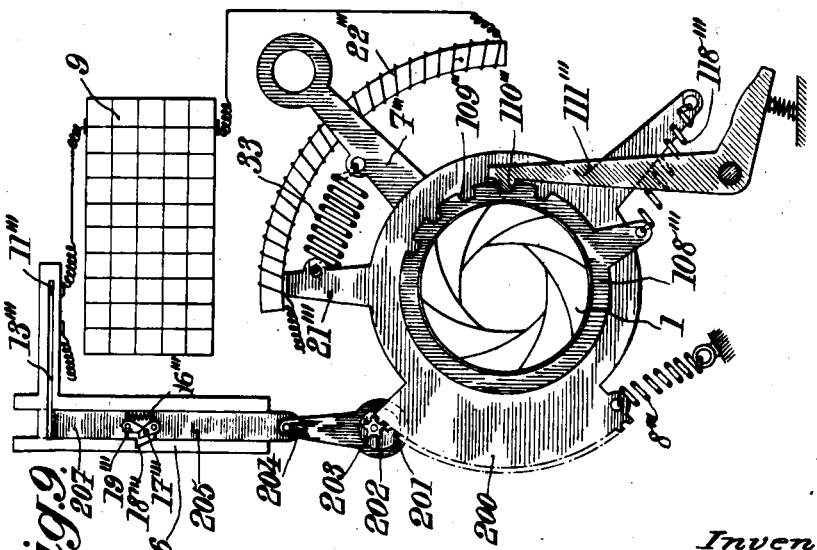
Inventor:
Alphonse Martin,
Attorneys Patented May 13, 1941

2,242,013

UNITED STATES PATENT OFFICE 2,242,013

PHOTOGRAPHIC OR CINEMATOGRAPHIC CAMERA OR THE LIKE

Alphonse Martin, Saint-Ouen, France

Application October 11, 1938, Serial No. 234,476
In Luxemburg March 26, 1938

21 Claims. (Cl. 95—10)

The present invention relates to systems including at least one movable device which is to occupy a position depending upon the value of a variable which can be measured, and the invention is more especially, although not exclusively, concerned with photographic or cinematographic cameras the diaphragm or equivalent device of which is to be adjusted as a function of the lighting of the photographic subject.

The chief object of the present invention is to provide a system of the type above mentioned which is better adapted to meet the requirements of practice than similar systems used up to this time, and in particular which is simpler to operate.

According to an essential feature of the present invention, the system in question includes means for measuring the value of the variable which is to determine the position of the movable device, said means being adapted to stop this device at a given point of its displacement, depending upon the value of said variable, and locking means for said movable device, adapted, as soon as the stopping means have coacted with said movable device, substantially to release the pressure exerted by said movable device on said stopping means.

According to another feature of the present invention, which relates more especially to the case of cameras, and in particular cinematographic cameras, fitted with a photo-electric cell controlling said movable device, the mechanism is arranged in such manner that it is possible, at any time, independently of the operation of the camera proper, to modify the adjustment of said movable device, and to lock it in the position corresponding to the value of said variable at the time that is considered.

Other features of the present invention will result from the following detailed description of some specific embodiments thereof.

Preferred embodiments of the present invention will be hereinafter described, with reference to the accompanying drawings, given merely by way of example, and in which:

Fig. 1 is a front view, with parts removed, of a cinematographic camera made according to the present invention;

Fig. 2 is an external front view corresponding to Fig. 1;

Fig. 3 is a partial sectional view on the line 3—3 of Fig. 1;

Fig. 4 is a front view, with parts removed, of a cinematographic camera made according to another embodiment of the invention;

Fig. 5 is an external front view corresponding to Fig. 4;

Fig. 6 is a front view of a mechanism of the type described for a camera, made according to another embodiment of the invention;

Fig. 7 is a side view of the mechanism of Fig. 6;

Fig. 8 is a partial view showing, on an enlarged scale, some parts of this mechanism;

Fig. 9 is a front view showing, in a given relative position of the parts, a portion of a mechanism of the type above referred to, made according to still another embodiment of the invention;

Fig. 10 is a view, similar to Fig. 9, showing the parts in a different relative position.

The photographic or cinematographic camera proper is made in any suitable manner, provided that it is fitted with a diaphragm 1 capable of adjusting the light flux admitted onto the lens 2 of the camera in question.

It is known that the aperture of such a diaphragm depends, among other factors, upon the illumination of the subject to be photographed, and that the value of such an illumination can be measured in an accurate manner by means of a photo-electric cell which feeds current to an ammeter, a galvanometer, or the like.

There exists a direct relation between the position of the index of this ammeter or the like and the aperture of diaphragm 1.

Various systems have already been proposed for interconnecting the aperture of the diaphragm and the position of the index of said measurement apparatus. These systems generally include a movable device operatively connected with the diaphragm and capable of occupying different positions corresponding to those of the index. As a rule, devices of this kind have the disadvantage of subjecting the index in question, and therefore the measurement apparatus, to exaggerated stresses.

An essential object of the present invention is to obviate this drawback, and for this purpose, said movable device is combined with locking means such that, once the desired position of adjustment has been reached, the measurement apparatus or its index is substantially released from any stress.

According to the present invention, concerning the means for adjusting the aperture of diaphragm 1, they can be made in any suitable manner. For instance, a toothed ring 3, rigid with the control ring of said diaphragm, is arranged to coact with a rack 4 carried by a frame or support 5 slidably mounted in slideways 6 and subjected to the action of an operating lever 7. A spring 8 is provided for urging frame 5 toward its lower position (in which position, for instance, the aperture of the diaphragm is minimum).

Concerning now the device for measuring the illumination of the subject to be photographed, this device is essentially constituted, as above explained, by a photo-electric cell 9, which is preferably located close to lens 1 and which is connected to an ammeter or the like 10. Advantageously, the index 11 of this ammeter is movable in front of a dial 12 which indicates the degree of opening of the diaphragm which is optimum for each value of the illumination of photo-electric cell 9.

Finally, concerning the locking means for the movable device above referred to, they are, for instance, arranged in such manner that the index 11 of the ammeter produces, at the desired time, that is to say when the degree of opening of the diaphragm is optimum, the locking of frame or support 5, which then coacts with an abutment other than the index.

According to a first embodiment of the invention, shown by Figs. 1 to 3, the displacement of index 11 is guided in a slot 13 provided in a piece, such for instance as a cross member 14, rigid with slideways 6.

In these slideways, and in line with frame 5, I provide a piece 15 which is connected to said frame through elastic means, such for instance as a spring 16. This piece 15 is provided with a stepped front edge 15a adapted to bear against index 11 through that of its steps which is located opposite said index, the lower steps corresponding to small deviations of index 11, and therefore to low illuminations of the subject to be photographed.

The means for producing the locking of piece 5 at the time of the contact of the movable device with index 11 are constituted, for instance by pawls 17 pivoted to frame 5 and adapted to engage in notches 18 provided in slideways 6. These pawls are connected to piece 15 through small connecting rods 19 inclined in such manner that, when frame 5 is moving toward said piece 15, against the action of spring 16, said pawls engage into the corresponding notches 18 of fixed part 6, thus locking the diaphragm adjusting device and accordingly releasing the index from any stress.

Finally, I insert, between cell 9 and the ammeter 10, a rheostat 20 which permits of adjusting the intensity of the current flowing through said ammeter as a function of parameters which are to intervene in the determination of the optimum degree of opening of the diaphragm for a given illumination of the subject to be photographed, for instance as a function of the sensitiveness of the film that is employed in the camera or of the time of exposure to be chosen for each picture.

The operation of such a mechanism is then the following:

Rheostat 20 having been adjusted as a function of the sensitiveness of the film and of the time of exposure, index 11 comes to occupy, when the operator turns the camera in the direction of the subject to be photographed, a position which depends upon the exposure of said subject. As soon as the operator depresses lever 7, frame 5 moves upwardly, producing a gradual opening of the diaphragm. When one of the steps of side 15a of part 15 comes into contact with index 11, said piece 15 is stopped, and the slight supplementary displacement of frame 5, which is made possible by the provision of spring 16, produces the outward pivoting of pawls 17, which engage in the notches 18 located opposite them, and lock frame 5 in a position to which corresponds the optimum degree of opening of diaphragm 1. In any case, with such an arrangement, index 11 is subjected, in the course of the operation, only to a slight and temporary pressure, just sufficient for engaging pawls 17 into the corresponding notches.

I may also, according to another embodiment of the invention, arrange the mechanism in such manner that the displacements of rack 4 (which controls the displacement of diaphragm 4) produce, for instance through a modification of the value of the resistance of the electric circuit of ammeter 10, or of the energizing flux of cell 9, the return of index 11 into a predetermined position, said index then producing, once this position has been reached, the locking of said rack and of the diaphragm operatively connected therewith.

Such an operation is obtained with the embodiment of Figs. 4 and 5.

In this case, as above explained, piece 5' (downwardly urged by spring 8') which slides in guide 6' which carries rack 4' controls the displacement of a piece 15', connected with said piece 5' (downwardly urged by spring 8') which slides in guide 6' through a spring 16', in such manner that the movement of these two parts toward each other has for its effect to operate a locking system, such for instance as a locking pawl 17', controlling link 19' and ratchet 18'.

The upward displacements of piece 5' are arranged to produce a variation of the intensity of the current fed to the ammeter, and, for this purpose, I may, for instance, fit this piece 5' with a sliding member 21 adapted to coact with a rheostat 22 inserted in the electric circuit of said ammeter. Advantageously, this rheostat is carried by a sliding plate or support 23 the position of which can be adjusted for taking into account the time of exposure and the sensitiveness of the film.

Piece 15' is provided with a rack 15a with which index 11', guided in slot 13' in cross member 14', can coact, when it has been brought back into its initial position by the variation of the current intensity. When index 11' coacts with rack 15a, it stops piece 15', thus selecting the optimum degree of opening of the diaphragm.

Whatever be the particular embodiment that is chosen, the operation of the whole is such that the mere operation of control member 7' automatically ensures the correct adjustment of the diaphragm, and this under conditions of total safety, since there is no risk of injury of the index of the measurement apparatus.

Of course, it is of interest to combine the control of the adjustment of the diaphragm with that of the shutter release mechanism, and in this case it suffices, for instance, to provide, for the operating lever 7', a complementary stroke which enables it to act on a member 34 which controls said shutter release mechanism.

Lever 7' is then connected to frame or support 5 through an elastic system such as 33.

It will be readily understood that, with such an ararngement, the operator makes a single move, which consists in depressing lever 7', for ensuring successively, the adjustment of the degree of opening of the diaphragm, and the release of the shutter mechanism.

A camera made as above described is well adapted to scientific filming, such for instance as that in which successive pictures are taken of transformation or growth of vegetable elements. It will suffice, in this case, to provide a clockwork mechanism capable of acting at predetermined intervals on lever 7', the diaphragm automatically assuming, for every picture, the correct degree of opening.

I might even, in case of need, cause the selecting device to control a relay system for measuring an additional artificial lighting, when the lighting supplied by the sun is insufficient.

I might also, according to other methods of application, have recourse to a selecting device of the kind of those above described for constituting systems of transmission to a distance of indications supplied by measurement apparatus (thermometer, anemometer, and so on). For this purpose, it would suffice, for instance, to cause the selecting device to coact with a mechanism for adjusting the frequency of electrical impulses as a function of the position of the index of the camera, and to provide means such that the operating member of the selecting device produces, at the end of its stroke, the emission of the impulses, the frequency of which has been previously adjusted.

According to the embodiments shown by Figs. 1 to 5, it should be noted that, when operating lever 7 or 7' is moved backward, the diaphragm is released, that is to say ceases to be locked.

It may be of interest, on the contrary, according to another feature of the invention, to devise the diaphragm adjustment mechanism in such manner as to comply with the following conditions:

(a) On the one hand, after each adjustment operation, said diaphragm is kept in locked position, even after the control means have been released;

(b) On the other hand, said diaphragm can pass into another position after the control member has been again depressed.

For this purpose, according to this feature of my invention, the rack is not directly coupled with the diaphragm. It cooperates with an intermediate piece 100, movable with respect to the frame, and means are provided for bringing back said diaphragm, near the end of the stroke of the control member 7", into a position which depends upon the position given at this time to said intermediate piece 100.

It will be readily understood that, with such an arrangement, during the whole of the period of operation of the rack, diaphragm 1 remains stationary and is brought into its new position, under the effect of its return means, only after the control member has been moved to the end of its stroke.

Such an arrangement, in particular, makes it possible to proceed to several successive adjustments of the diaphragm during the operation of the camera, without having to stop the taking of pictures. This possibility is due to the fact that, by acting on the control member, the rack is displaced into a new position if the conditions of illumination of the subject to be photographed have varied. During this period of adjustment, the position of intermediate piece 100 is modified but the degree of opening of diaphragm 1 does not vary. If the control member is then brought to the end of its stroke, the above mentioned return means are brought into play for causing the degree of opening of the diaphragm to pass from its old value to the new one corresponding to the position occupied at this time by the intermediate piece 100, and this movement of the diaphragm takes place directly, that is to say without the degree of opening of the diaphragm passing through values outside of the interval existing between the old degree of opening and the new one, which would be detrimental to the taking of satisfactory pictures during the period of adjustment.

In order to make an apparatus which complies with the conditions above set forth, many various embodiments may be employed, and in the embodiment of Figs. 6 to 8 the general principle of the apparatus is substantially the same as that of the apparatus of Figs. 1 to 3.

In this new embodiment, the control member, which, in this case, is constituted by a push-piece 7", carries a rack 101 adapted to coact with a pinion 102 angularly rigid with a pinion 103, itself in mesh with a rack 104 carried by a bent piece 105, the whole of these elements of the mechanism being housed in the side of the casing of the photographic camera.

Piece 105 is connected, through a spring 33", with support 5", which is guided in its slideways 6" and is urged in the downward direction by spring 8".

Support 5" is connected through a spring 16" with a piece 15" made as above described for the preceding embodiments, and having a stepped edge 15a", means 17", 18" and 19" similar to members 17, 18 and 19 in Figs. 1 to 3 being provided for relieving the stress to which the index 11" is subjected.

This support 5" carries a rack 4", arranged to coact with teeth carried by the periphery of intermediate piece 100. Advantageously, this intermediate piece is constituted by a ring the periphery of which is in the form of a logarithmic spiral.

Furthermore, push-piece 7" is so arranged that, at the end of its active stroke, it produces the displacement of a rod 106 which releases the shutter mechanism of the camera. The stopping of the operation of said camera can be obtained by means of a return push-piece 107.

Concerning now the return means for bringing the diaphragm into its new position every time push-piece 7" is actuated, they are made in the following manner:

On the one hand, during the displacement of support 5", diaphragm 1 is to remain locked;

On the other hand, near the end of the stroke of control member 7", and preferably before the camera is started working, diaphragm 1 is released and compelled to occupy the new position corresponding to the new position occupied by intermediate piece 100, said diaphragm being again locked in this position as soon as the operator ceases to act on member 7".

In particular, in order to obtain this result, I may have recourse to elastic means for ensuring the displacements of diaphragm 1.

For instance, the external ring of the diaphragm mechanism carries a ring 108 carrying a series of notches 109. A locking finger 110, carried by one end of a lever 111 pivoted about a fixed axis 112, is adapted to cooperate with any of these notches.

Lever 111 is subjected to the action of a spring 113 tending to ensure the engagement of finger 110 with the notches 109 of ring 108.

The other end of said lever 111 is caused to coact, preferably through a roller 114, with a cam 115 carried by piece 105 and arranged in such manner that, when said piece 105 comes near the end of its stroke, after rack 4″ has been stopped, said cam compels lever 111 to pivot and thus to ensure the release of ring 108.

Interposed between pieces 100 and 108, there are elastic means. For instance, the intermediate piece 100 is provided with an abutment 116, and ring 108 is provided with an abutment 117 (pieces 100 and 108 being arranged coaxially with each other), and two springs 118 and 118′ are interposed between these two abutments, these springs being preferably arranged along semi-circumferences. With such an arrangement, these springs constantly tend to bring ring 108 into the mean position with respect to piece 100.

The operation of these return means takes place as follows:

During the whole of the upward displacement of rack 4″ ring 108 is locked in the position it occupies and the degree of opening of diaphragm 1 remains the same. Once the rack is stopped, piece 100 has come to occupy a position for which one of the springs 118 and 118′ is compressed, if it be supposed that the degree of opening of the diaphragm is no longer that corresponding to the actual illumination conditions. If push-piece 7″ is depressed, cam 115 produces the release of ring 108 and the spring (118 or 118′) which is compressed now expands and produces the desired change in the degree of aperture of the diaphragm.

When the operator ceases to act upon push piece 7″, finger 110 comes back into the position in which it locks ring 108.

In this way, I obtain a camera which, in addition to the advantages above set forth, is capable of ensuring the automatic adjustment of the diaphragm through a mere actuation of the operating member 7″.

Of course, member 7″ might itself be automatically actuated, for instance, as shown by Fig. 7, by means of a driving finger 300 actuated by a suitable mechanism 301 coupled with the camera mechanism, said finger acting on a lug 302 carried by piece 105. With such an automatic control, operating member 7″ is operated at regular intervals of time and without any action of the operator.

In Figs. 9 and 10, I have shown, also by way of example, another embodiment of the device according to my invention, characterized in that the control member, that is to say lever 7‴, is caused to operate a reciprocating piece across the path of which index 11‴ comes when the degree of opening of diaphragm 1 reaches the desired value, said index then producing the locking of the diaphragm operating device.

It will be readily understood that the displacement of index 11‴ from the position it initially occupies to said predetermined position will be the more important as its initial deviation will have been greater, and that, accordingly, diaphragm 1 will be locked in the position which is the best on account of the illumination of the subject to be photographed.

Preferably, the oscillating movement of the element adapted to cooperate with the index will be of a frequency as high as possible, with reference to the rate of displacement of the diaphragm control means, in such manner that said oscillating element comes into contact with index 11‴ practically as soon as the latter comes across the path of said oscillating element.

Of course, there are many specific manners of constituting said oscillating element, and the associated means for moving the diaphragm control means. I have found, in practice, that it is advantageous to make use of the arrangement illustrated by Figs. 9 and 10.

In this embodiment of my invention, lever 7‴ is connected, through a spring 33‴, with a rotary piece 200 which carries the sliding contact piece 21‴ moving over resistance 22‴ connected to cell 7‴ and is subjected to the action of a return spring 8‴.

I provide, along a portion of the periphery of this piece 200, teeth 201, adapted to coact with a pinion 202, turning together with an eccentric 203 which controls, through a connecting rod 204, a sliding member 205, guided in slideways 206, disposed perpendicularly to slot 13‴.

Sliding member 205 coacts with a sliding sensitive piece 207 connected with said sliding member 205 through a system such that, when piece 207 comes into contact with index 11‴, said system ensures the locking of the sliding member along slideways 206, and simultaneously produces a slight backward movement of piece 207 which tends to relieve the stress on index 11‴ resulting from the operation of diaphragm 1. This system is constituted, for instance, as above described by a spring 16‴ which tends to keep pieces 205 and 207 apart from each other, and a pawl 17‴ pivoted to sliding member 205 and cooperating with piece 207 through a connecting rod 19‴. The end of said pawl is adapted to engage in notch 18‴ provided in one of the slideways 206 when piece 207 is stopped by index 11‴ and sliding member 205 moves closer to piece 207 against the action of spring 16‴.

In this embodiment also, instead of coupling piece 200 directly with the ring of diaphragm 1, it is caused to coact with an intermediate ring 108‴ connected to piece 200 through a spring 118‴ which tends always to bring it back to the same relative position with respect to said piece 200. A locking finger 110‴ carried by a lever 111‴ is provided, which engages into the teeth 109‴ carried by a ring 108‴, and can be moved away from said teeth at the end of the adjustment stroke of lever 7‴, thus allowing ring 108‴ and diaphragm 1 to come into their new positions.

This camera mechanism works in the following manner:

When the operator acts upon lever 7‴, he produces, at the same time as a continuous rotation of piece 200, alternating displacements of piece 207. As soon as index 11‴ comes across the path of said piece 207, pawl 17‴ engages into notch 18‴. Piece 200 is locked in its position and index 11‴ is relieved from the stress it might otherwise undergo, due to the slight backward movement of piece 207 resulting from the engagement of pawl 17‴ into notch 18‴ (position shown by Fig. 10). Lever 7‴ can then be further moved, against the action of spring 33‴, until it produces the pivoting of lever 111‴ and the disengagement of finger 110‴ from teeth 109‴. Once it is released, ring 108‴ is returned by spring 118‴ into the position corresponding to the locking position of piece 200. Finally, when the operator releases lever 7‴, finger 110‴ again engages into teeth 109‴ and locks rings 108‴ in the new position it now occupies.

In any case, a mechanism such as above described has, among many other advantages, that of being highly sensitive, due to the fact that the reciprocating member which cooperates with index 11'''' moves at a high frequency as compared with the rate of displacement of the diaphragm control means.

Furthermore, the mechanism above described is very strong, due to the fact that index 11'''' is relieved from any stress as soon as it produces the engagement of pawl 17'''' with its notch 18''''.

Of course, a selecting device of the type above described might be employed in combination with means for adjusting the time of exposure, instead of cooperating with a diaphragm control mechanism, and in this case, the adjusting means should be arranged to be able to compensate for variations of the degree of opening of the diaphragm.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. A device of the type described which comprises, in combination, a fixed frame, a measurement apparatus including a part stationary with respect to said frame and a member movable with respect thereto, a structure movable with respect to said frame, control means for actuating said structure, and cooperating means carried by said structure and frame operative by relative movement between said structure and said member for locking said structure with respect to said frame when said structure and said member occupy a predetermined relative position with respect to each other.

2. A device of the type described, for use on a camera, which comprises, in combination, a fixed frame carried by said camera, an illumination measurement instrument including a part stationary with respect to said frame and an indicating member movable with respect thereto, a diaphragm adjustment mechanism carried by said frame, an element adapted to control said mechanism, movable in said frame, and cooperating means, carried by said element and frame, for locking said element with respect to said frame when said means contact said indicating member.

3. A device of the type described, for use on a camera, which comprises, in combination, a fixed frame carried by said camera, an illumination measurement instrument including a part stationary with respect to said frame and an indicating member movable with respect thereto, a diaphragm adjustment mechanism carried by said frame, an element adapted to control said mechanism, movable in said frame, a part elastically carried by said element adapted to come into contact with said indicating member, and cooperating means carried by said element and frame, operative by displacement of said part with respect to said element resulting from the contacting of said part with said indicating member, for locking said element with respect to said frame.

4. A device of the type described, for use on a camera, which comprises, in combination, a fixed frame carried by said camera, an illumination measurement instrument including a part stationary with respect to said frame and an indicating member movable with respect thereto, a diaphragm adjustment mechanism carried by said frame, an element movable in said frame operatively connected with said mechanism so that displacement of said element produces a simultaneous adjustment of said mechanism, a part elastically carried by said element adapted to come into contact with said indicating member, and cooperating means carried by said element and frame, operative by displacements of said part with respect to said element resulting from the contacting of said part with said indicating member, for locking said element with respect to said frame.

5. A device of the type described, for use on a camera, which comprises, in combination, a fixed frame carried by said camera, an illumination measurement instrument, including a part stationary with respect to said frame and an indicating member movable with respect thereto, a diaphragm adjustment mechanism carried by said frame, an element slidable in said frame operatively connected with said mechanism so that displacement of said element produces a simultaneous and corresponding adjustment of said mechanism, a part, also slidable in said frame, elastically connected with said element, the movement of said indicating member being transverse to the sliding movement of said element and said part and the paths of said member and said part intersecting each other and at least one of the two last mentioned organs being inclined so that the sliding displacement to be imparted to said part for bringing it into contact with said indicating member depends upon the deflection of said member from a mean position, and cooperating means carried by said element and frame, operative by displacement of said sliding part with respect to said sliding element resulting from the contacting of said part with said indicating member, for locking said element with respect to said frame.

6. A device of the type described, for use on a camera, which comprises, in combination, a fixed frame carried by said camera, an illumination measurement instrument including a part stationary with respect to said frame and an indicating member rotatable with respect thereto, a diaphragm adjustment mechanism carried by said frame, an element slidable in said frame in a direction at right angles to the plane in which said indicating member rotates, said element being operatively connected with said mechanism so that displacement of said element produces a simultaneous and corresponding adjustment of said mechanism, a part, also slidable in said frame together with said element, elastically connected with said element, said part having a stepped edge adapted to contact said indicating member, whereby the sliding displacement to be imparted to said element and said part for bringing said part into contact with said indicating member depends upon the angular deflection of said member from a mean position, and cooperating means carried by said element and frame, operative by displacement of said sliding part with respect to said sliding element, resulting from contact of said part with said indicating member, for locking said element with respect to said frame.

7. A device of the type described, for use on a camera, which comprises, in combination, a fixed frame carried by said camera, an illumination measurement instrument including a part stationary with respect to said frame and an indicating member rotatable with respect thereto, a diaphragm adjustment mechanism carried by said frame, an element, slidable in said frame in a direction at right angles to the plane of rotation of said indicating member, adapted to control said mechanism, means for actuating said element, means operative by said actuating means for moving said indicating member toward a mean predetermined position at a rate proportional to the displacement of said element, a part slidable in said frame together with said element and elastically connected therewith adapted to contact said indicating member in this predetermined position thereof, and cooperating means carried by said element and frame, operative by displacement of said part with respect to said element resulting from the contacting of said part with said indicating member, for stopping said element with respect to said frame.

8. A device of the type described, for use on a camera, which comprises, in combination, a fixed frame carried by said camera, an illumination measurement instrument carried by said camera including a part stationary with respect to said frame and an indicating member movable with respect thereto, a diaphragm adjustment mechanism carried by said frame, an element, slidable in said frame in a direction at right angles to the path of displacement of said indicating member, adapted to control said mechanism, means for actuating said element, means operative by said actuating means for moving said indicating member toward a mean predetermined position at a rate proportional to the displacement of said element, a part slidable in said frame together with said element and elastically connected therewith adapted to contact said indicating member in this predetermined position thereof, and cooperating means carried by said element and frame, operative by displacement of said part with respect to said element resulting from the contacting of said part with said indicating member, for locking said element with respect to said frame.

9. A device of the type described, for use on a camera, which comprises, in combination, a fixed frame carried by said camera, an illumination measurement instrument carried by said camera including a part stationary with respect to said frame and an indicating member movable with respect thereto, a diaphragm adjustment mechanism carried by said frame, means for temporarily locking said adjustment mechanism in the position it occupies, an element, slidable in said frame in a direction at right angles to the path of displacement of said indicating member, an intermediate piece, movable in said frame, operatively connected with said sliding element, means, carried by said element, adapted to cooperate with said indicating member, for stopping said element in the position it occupies when said means are in contact with said indicating member, elastic means for interconnecting said diaphragm adjustment mechanism and said intermediate piece, whereby said mechanism tends to occupy a position corresponding to the position of said piece, means for actuating said element, including an elastic connection, whereby said actuating means can be moved beyond the position corresponding to the stopping of said element, and means, operative by this supplementary stroke of said actuating means, for temporarily bringing the adjustment mechanism locking means out of action.

10. A device according to claim 9 in which the means for stopping said element are adapted to lock it with respect to said frame.

11. A device according to claim 9 in which the means for stopping said element are adapted to lock it with respect to said frame, further including means for automatically operating said actuating means at predetermined intervals of time.

12. A device of the type described, for use on a camera, which comprises, in combination, a fixed frame carried by said camera, an illumination measurement instrument including a part stationary with respect to said frame and an indicating member movable with respect thereto, a diaphragm adjustment mechanism carried by said frame, an element, movable in said frame, for controlling said mechanism, a reciprocating member, movable along a path intersecting a predetermined mean position of said indicating member, operative by said element, means for actuating said element, means operative by said actuating means, for moving said indicating member toward said predetermined mean position at a rate proportional to the displacement of said element, and cooperating means carried by said element and frame, operative by the contacting of said reciprocating member with said indicating member, for stopping said element when said indicating member comes into said predetermined position.

13. In a device of the type described, a fixed frame, a member movable in response to variations in a function, a movable control element, and means cooperating with said control element and member and operated by movement of the control element for locking the control element against movement with respect to the frame in one direction when the control element reaches a position corresponding to the position of the member, said locking means including a part carried by the frame and a second part operatively connected to said control element adapted to engage the first part independently of said member.

14. In a device of the type described, a member movable in response to variations in a function, a movable control element, a part movable to engage said member, means operatively connecting said part to said element whereby movement of said element in one direction moves said part in a direction to engage said member, said means permitting a relative movement between said part and said element in the opposite direction when said part engages said member, and means operated by said last relative movement to stop further movement of said part in the direction of said member, said last means exerting no force on said member.

15. In a device of the type described, a member movable in response to variations in a function, a movable control element, a part movable to engage said member, means operatively connecting said part to said element whereby movement of said element in one direction moves said part in a direction to engage said member, said means permitting a relative movement between said part and said element in the opposite direction when said part engages said member, and means operated by said last relative movement to stop further movement of said part in the direction of said member and to exert a force on said part tending to move the part away from the member, said last means exerting no force on said member.

16. In a device of the type described, a member movable in response to variations in a function, a movable element, a part operatively connected to said movable element for movement therewith in the direction of said member, means for normally maintaining said element and part in separated relation, said last means permitting said element and part to approach when said part is stopped in its movement by engagement with said member, and means operated by such approach to stop further movement of said part in the direction of said member, said last means being inoperative to exert any force on said member.

17. In a device of the type described, a fixed frame, a member movable with respect to said frame in response to variations in a function, an element movable with respect to said frame, a part movable with respect to said frame and member, means operatively connecting said part and said element whereby movement of said element in one direction moves said part in a direction to engage said member, said means permitting a relative movement between said part and member in the opposite direction when said part engages said member, a linkage system connected to said part and member and deformable by relative movement therebetween, and means carried by said linkage system and frame and operated by said relative movement to lock said part with respect to the frame.

18. A device as claimed in claim 17 in which said linkage system comprises pivotally connected links pivoted to said element and part respectively, and said last means includes a part carried by one of said links.

19. A device as claimed in claim 17 in which said last means includes a pawl carried by said linkage system and a ratchet tooth carried by said frame.

20. In a camera having an adjustable diaphragm, a movable member operatively connected to the diaphragm to adjust the same, an element movable with respect to said member, an illumination measuring instrument having a part movable in response to variations in illumination, means to stop the movement of said element in a position determined by the position of said part, means for moving said movable element towards such position, means normally holding said movable member stationary, means resiliently connecting said member and element, and means operated by movement of said moving means when movement of said element is stopped to release said holding means, whereby said resilient means moves said member to a position determined by the position of said part.

21. In a device as claimed in claim 20, means to operate said moving means at predetermined time intervals.

ALPHONSE MARTIN.